Nov. 24, 1970 W. E. CUBBERLY, JR 3,543,231
RIGID FLUID-EXCLUDING HOUSING FOR ACOUSTIC WELL-LOGGING TOOLS
Filed Oct. 8, 1968
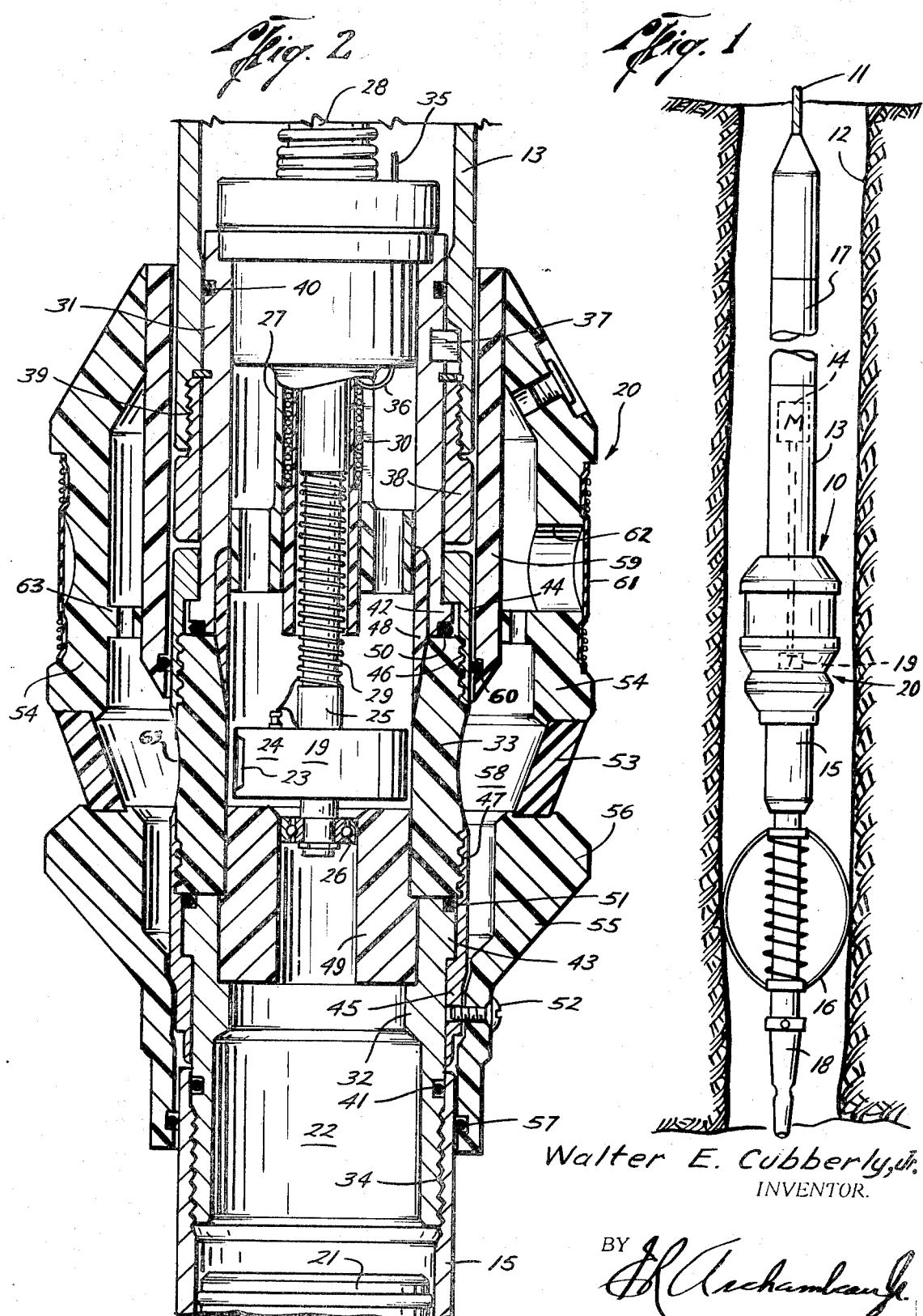
Walter E. Cubberly, Jr.
INVENTOR.
BY
ATTORNEY

United States Patent Office 3,543,231
Patented Nov. 24, 1970

3,543,231
RIGID FLUID-EXCLUDING HOUSING FOR ACOUSTIC WELL-LOGGING TOOLS
Walter E. Cubberly, Jr., Houston, Tex., assignor to Schlumberger Technology Corporation, New York, N.Y., a corporation of Texas
Filed Oct. 8, 1968, Ser. No. 765,892
Int. Cl. G01v 1/40, 1/22, 1/04
U.S. Cl. 340—17                                29 Claims

ABSTRACT OF THE DISCLOSURE

As a preferred embodiment of the invention disclosed herein, a fluidtight tool housing enclosing rotatable high-frequency acoustic-transducer means includes one or more wall sections of a selected plastic material of sufficient strength to withstand adverse well bore environments without appreciably affecting high-frequency acoustic signals passing therethrough. The plastic wall sections are also uniquely positioned to avoid objectionable signal interference that would otherwise be caused by the reflection of transmitted acoustic signals therefrom.

---

Recent advances in techniques for investigating well bores have resulted in the development of acoustic-logging apparatus for providing visual displays of the wall surfaces of a well bore. In general, such apparatus includes a cable-suspended well tool in which repetitively-operable directional acoustic transducer means operating at a high-frequency are rotated about the axis of the well bore. By progressively sweeping such repetitively-emitted high-frequency acoustic signals around the circumference of the well bore wall, corresponding reflected signals will be obtained which will vary in accordance with various characteristics of the scanned well bore wall. Thus, as the tool is moved along a well bore, these reflected acoustic signals are appropriately converted to derive a record which is indicative of the characteristics of the successively-scanned portions of the well bore wall. Such records are, of course, particularly useful for indicating the presence of anomalies in a well bore wall as well as variations in the nature of the formation materials surrounding the well bore. In fact, present-day logging apparatus of this nature is capable of producing visual displays having sufficient resolution to portray even such minor anomalies as formation fractures in a borehole wall or perforations in a well casing.

It will, of course, be appreciated that to obtain an uninterrupted visual display of the full circumference of a well bore wall, the wall of the housing immediately surrounding the transducer means must not unduly affect either the transmission or the reception of the high-frequency acoustic signals in any direction. In addition to not affecting these acoustic signals, the housing wall enclosing the acoustic transducer means must also protect the transducer means from the severe environmental conditions typically found in well bores.

Since a relatively-high operating frequency (at least 500 kc. or greater) is required to achieve sufficiently resolved visual displays, those skilled in the art have recognized that the enclosure around the transducers must be capable of passing acoustic energy without undue attenuation or scattering. However, the usual materials used in low-frequency logging tools have been found to be incapable of efficiently passing high-frequency acoustic energy. Accordingly, typical high-frequency acoustic-logging tools have heretofore generally included tubular housing sections of metal that are tandemly coupled together by an axial load-supporting member so as to leave an unobstructed circumferential space between their adjacent ends that is covered by a thin elastomeric membrane to protect the rotatable transducer means behind the elastomeric cover. Those skilled in the art realize, however, that even the best of such constructional arrangement are not sufficiently rugged to adequately protect the relatively-fragile acoustic transducers usually employed in such tools. Moreover, an axial supporting rod of sufficient strength also significantly reduces the space available for the transducers as well as unduly complicates the mechanical design.

Accordingly, it is an object of the present invention to provide a rugged, fluidtight enclosure for acoustic logging tools having one or more wall portions of a particular selected composition that will neither materially affect high-frequency acoustic signals passing therethrough nor significantly reduce the overall mechanical strength of the enclosure.

This and other objects of the present invention are attained by uniquely interconnecting the opposed ends of two housing sections of an acoustic logging tool by a section of a selected plastic composition capable of withstanding typical well bore conditions without unduly interfering with the transmission and reception of high-frequency acoustic signals therethrough. To avoid interference that would otherwise be caused by reflections of outwardly-transmitted acoustic signals from the plastic section, directional acoustic transducer means are operatively mounted immediately adjacent to and facing the inner wall of the plastic section. Furthermore, where the logging tool is to be used in larger well bores, a second plastic tubular section is coaxially mounted around the first plastic section to define an annular space therebetween for containing a liquid selected to efficiently transfer acoustic energy. So that this outer coaxial section will not reflect outwardly-transmitted acoustic energy back onto the transducer means, the walls of this outer section are inclined at an angle between 70° and 90° to the operating axis of the transducer means that is adapted to direct such reflected signals away from the transducer means.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 illustrates a typical acoustic logging tool arranged in accordance with the principles of the present invention; and FIG. 2 is an enlarged view of the central section of the logging tool depicted in FIG. 1 and partially cross-sectioned to show a preferred embodiment of the present invention.

Turning now to FIG. 1, an acoustic logging tool 10 is shown suspended from a suitable cable 11 within a borehole 12. As is typical, the logging tool 10 comprises a central support which is conveniently arranged as a number of tandemly-connected housing sections which preferably include an intermediate section 13 enclosing a selectively-operable motor 14 and a lower housing section 15 carrying a centralizer 16 for maintaining the tool concentrically disposed in the borehole 12. In some instances, a second centralizer (not shown) may also be mounted, as on an upper housing section 17, near the upper end of the tool 10. To absorb the shocks resulting upon striking obstructions as the tool is being lowered into the borehole 12, a resilient nose piece 18 is preferably mounted on the lower end of the housing section 15.

Inasmuch as the present invention is particularly directed to the new and improved enclosure for the acoustic-logging tool 10, the specific details of the electrical circuitry employed in the tool and at the surface are, therefore, of no particular significance in fully understanding the invention here. Thus, it is sufficient to say only that a preferred embodiment of the circuitry for the tool 10 is fully described in a copending application, Ser. No. 697,796, filed Jan. 15, 1968.

In this new and improved circuitry, directional high-frequency acoustic-transducer means (such as at 19 in FIG. 1) having a directed axis of operation are adapted to be rotated about the vertical axis of the tool 10 by the motor 14 so as to progressively traverse the operational axis of the transducer means along a predetermined plane transverse to the tool axis. By arranging the transducer means 19 within a housing section or enclosure 20 arranged in accordance with the principles of the present invention, the adjacent surfaces of the well bore (such as the wall of the borehole 12) will be progressively subjected to repetitive bursts of radially-directed high-frequency acoustic energy.

As these outwardly directed bursts progressively scan the circumference of the borehole 12, the resulting reflections of acoustic energy (which are, of course, influenced by the composition or character of the borehole wall) received by the rotating transducer means 19 will develop corresponding electrical signals. By means of the electrical circuitry, these electrical signals produce a continuous record or visual display on an image-reproducing device, such as an oscilloscope, included with the circuitry at the surface. The electrical circuitry also preferably includes appropriate means for presenting at the surface depth-correlation information as well as indications of the angular or azimuthal position of the transducer means 19. As a result, the resulting visual record provided by the logging tool 10 will present a fairly representative picture of the well bore wall which has sufficient resolution for locating even small defects such as fractures or casing perforations. Moreover, by virtue of the correlative depth and azimuth informations, the position in the well bore of any anomalies shown on the visual record can be accurately determined.

Turning now to FIG. 2, a detailed view is shown of a preferred embodiment of the enclosure 20 incorporating the principles of the present invention. As shown there, the new and improved enclosure 20 is tandemly coupled between the opposed lower and upper ends of the adjacent housing sections 13 and 15 and, as will subsequently be described, includes means for fluidly sealing and rigidly interconnecting these adjacent sections to one another.

To exclude dirty well bore fluids from the interior of the logging tool 10, the tubular housing sections 13, 15 and 20 are fluidly sealed at their respective coupled ends. Moreover, to equalize any significant pressure differentials that would otherwise exist between the interior and exterior of the housing sections 13, 15 and 20, a typical pressure-compensating piston 21 is slidably disposed in the lower housing section 15 and the interior spaces 22 of the housing sections thereabove are filled with a suitable oil or such (not shown). Thus, by admitting well bore fluids into the lower portion of the housing section 15, the piston 21 will maintain the oil in the spaces 22 above the piston at the hydrostatic pressure of the well bore fluids as well as accommodate volumetric changes caused by temperature variations of the oil.

In the preferred manner of arranging the radially-directional acoustic transducer means 19, a typical high-frequency transducer such as a piezoelectric crystal 23 is mounted on one side of an enlarged-diameter shoulder 24 near the lower end of an elongated axial shaft 25 that is journaled on a bearing 26 coaxially mounted within the oil-filled enclosure 20. The upper portion of the shaft 25 is extended upwardly through aligned concentric or annular guides 27 and 28 mounted in the housings 20 and 13, respectively, and operatively coupled to the motor 14 (FIG. 1) thereabove for rotating the outwardly-facing transducer crystal 23 about the central axis of the logging tool 10. Although individual transducers can, of course, be provided for separately transmitting and receiving acoustic energy, the previously described electrical circuitry is arranged to cyclically energize the crystal 23 to produce repetitive outwardly-directed bursts of acoustic energy as well as to alternately use the crystal for receiving the inwardly directed reflections resulting from each burst before the next burst is transmitted. Thus, by means of appropriate sequencing circuitry, the crystal 23 alternately transmits and receives radially-directed acoustic energy along its operational axis to produce the previously described visual record.

In the preferred embodiment of the logging tool 10, the electrical connections between the electrical circuitry and the crystal 23 include a unique arrangement of a first coaxial winding 29 wound on the rotating shaft 25 and inductively coupled to a second coaxial fixed winding 30 that is operatively secured within the stationary annular guide 27. In this manner, electrical signals to and from the rotating transducer 23 and its associated electrical circuitry are efficiently transferred between the cooperative windings 29 and 30 during the operation of the logging tool 10.

In general, the new and improved enclosure 20 of the present invention is comprised of inner and outer coaxially-arranged sections providing separate fluidtight spaces or chambers, with the inner section tandemly interconnecting the housing sections 13 and 15 and the outer section being readily removable from the inner section. Moreover, as will subsequently be described, although these uniquely arranged inner and outer sections of the enclosure 20 are sufficiently rugged for well bore service, each of the sections has a continuous circumferential wall portion through which laterally-directed high-frequency acoustic energy can be efficiently traversed in any angular direction along a predetermined plane of operation.

Accordingly, as best seen in FIG. 2, the preferred embodiment of the inner section of the enclosure 20 is comprised of upper and lower tubular members 31 and 32 secured and fluidly sealed to the opposite ends of an intermediate tubular member 33 of a selected plastic composition. In one manner of coupling the enclosure 20 to the lower housing section 15, the upper end of the housing section is counterbored and threaded as at 34 for complementally receiving the threaded lower end of the tubular member 32. Similarly, the upper end of the tubular member 31 is complementally fitted into the lower end of the housing section 13. To facilitate interconnection of electrical conductors, as at 35 and 36, in the housing sections 13 and 20, the mating ends of these sections are angularly aligned by a key and groove as at 37 and coupled to one another by a collar 38 rotatably mounted on the member 31 and adapted for threaded engagement with internal threads 39 on the lower end of the housing section 13. O-rings 40 and 41 on the upper and lower members 31 and 32, respectively, fluidly seal the enclosure 20 to the housing sections 13 and 15.

Since the threaded connections at 34 and 39 make it preferable that the tubular members 31 and 32 be of metal and the intermediate member 33 is of a selected plastic composition, particular attention is given to joining the sections 31–33 in such a manner as to insure that the completed assembly is rugged as well as fluidtight. Accordingly, in the preferred manner of accomplishing this, the ends of the tubular members 31 and 32 abutting the plastic member 33 are enlarged, as at 42 and 43, to provide rearwardly-facing shoulders ahead of internally threaded collars 44 and 45 loosely mounted on the tubular members respectively. The forward portions of the collars 44 and 45 are counterbored and project beyond the enlarged shoulders 42 and 43, with these conuterbores being internally threaded to complementally receive the externally threaded ends 46 and 47 of the plastic member 33. Thus, as the members 31–33 are being assembled, threading of the collars 44 and 45 onto the threads 46 and 47 will rigidly couple the tubular members once the collars engage the shoulders 42 and 43 and then draw the opposed ends of the tubular members into tight abutment with one another.

To augment the mechanical strength provided by the abovedescribed joint arrangement, insert sleeves 48 and 49 of a stout plastic material, such as an epoxy-fiberglass or the like, are snugly fitted into the tubular members 31–33 and positioned to overlap the joints at each end of the plastic tubular member. Moreover, when these members are assembled to form the inner section of the enclosure 20, the various facing surfaces are coated with a suitable adhesive, such as an epoxy cement, to securely bond the members into an integral assembly. Although the bonded joints are fluidtight, O-rings 50 and 51 are disposed in circumferential grooves defined between the opposed ends of the plastic member 33 and the tubular end members 31 and 32 for blocking entrance of well bore fluids.

Accordingly, it will be appreciated that once the fluidtight inner section of the enclosure 20 is assembled, its unique design will permit it to readily carry the axial loads as well as bending and torsional loads normally subjected to a well tool. It should be noted, however, that the assembled inner section is particularly designed to withstand severe compressive loads as well as tensile loads. For example, the flat abutting ends of the tubular members 31–33 enable upward impacts on the lower housing section 15 to be uniformly distributed through the tubular members and into the housing section 13. Similarly, since space is somewhat limited immediately above the transducer means 19, the upper insert 48 is preferably tapered as shown to avoid any abrupt change in the cross section of the plastic tubular member 33.

As previously mentioned, the enclosure 20 of the present invention is particularly arranged for the inner coaxial section to adequately interconnect the housing sections 13 and 15 so that the outer coaxial section can be simply removed when desired. Accordingly, as shown in FIG. 2, this outer coaxial section is arranged as a separate unit that is releasably secured to the inner coaxial section as by screws 52. In its preferred form, the outer coaxial section is comprised of a tubular section 53 of a selected plastic composition and concentrically supported around the member 33 by upper and lower annular supports 54 and 55. In their preferred arrangement, the upper and lower members 54 and 55 are formed of a rugged plastic composition as an epoxy-fiberglass.

The lower annular support 55 is preferably shaped with an outwardly-enlarged shoulder 56 to protect the tubular section 53 from striking well bore obstructions as the logging tool 10 is being lowered into a well bore. The lower end of the support 55 is snugly fitted over the body of the tool 10 and fluidly sealed thereto as by an O-ring 57. For reasons that will subsequently become apparent, the annulus 58 between the inner and outer coaxial sections of the enclosure 20 is also filled with a suitable liquid such as water, brine, or an oil such as that used within the interior space 22. Accordingly, to provide sufficient volume for accommodating volumetric changes in this liquid, the upper annular support 54 is extended. Although its upper end could just as well be fluidly sealed at this point directly to the housing section 13, it is preferred to dependently secure a cylindrical sleeve 58 within the upper end of the support 54 and extend this sleeve downwardly around the tool body to just above the plastic member 53. An O-ring 59 carried within the sleeve 58 fluidly seals the upper support 54 to the body of the tool 10. In this manner, when the outer coaxial section of the enclosure 20 is mounted onto the inner coaxial section, once the housing section 13 is coupled the outer coaxial section can be moved upwardly into its illustrated position without the O-ring 59 having to be passed over the coupling 38.

To maintain the liquid or oil in the outer annulus 58 at well bore pressure, an elastomeric sleeve 60 is fitted onto the upper support 54 over either a continuous circumferential slot therearound or a plurality of openings, as at 61, formed therein. To assemble the outer coaxial section of the enclosure 20, its various parts are bonded together into a unitary assembly by an epoxy adhesive or the like. If desired, an inwardly-projecting rib, as at 62, from the midportion of the upper support 54 can be bonded around the lower portion of the sleeve 58 for added reinforcement.

As previously mentioned, the tubular members 33 and 53 are of a plastic composition which must have particular properties. First, it will be recognized that acoustic energy to and from the logging tool 10 must pass through the well bore fluids and the oil-filled spaces 22 and 58 as well as one or both of the plastic coaxial members. Accordingly, one major criteria of the present invention is that the members 33 and 53 must, therefore, be of a material having a low acoustic resistance as well as a low characteristic or specific acoustic impedance to achieve optimum transfer of high-frequency acoustic energy. Moreover, where only a single transducer is used, these coaxial members 33 and 53 must also be positioned so that reflections of the outwardly-directed transmitted bursts against the plastic members will not interfere with the reception of the acoustic energy being reflected back from the well bore walls. Of equal importance, to the success of the invention, the physical properties of the selected plastic composition for the coaxial members 33 and 53 must be sufficient to withstand the adverse conditions typically found in a well bore. It will also be noted that the rigid plastic material of the members 33 and 53 is impervious to gas.

Accordingly, those skilled in the art will appreciate that the particular plastic composition selected for the tubular members 33 and 53 is not at all a mere choice of design. For example, although such relatively-strong plastics, as an epoxy-fiberglass and the like, are commonly used in well tools including even low-frequency acoustic logging tools, none of these plastic materials previously employed have been found to be of practical use for enclosing acoustic transducers operating at a selected frequency in the range of 500 kilocycles to 5 megacycles as to the transducer means 19 in the logging tool 10. For example, it has been found that epoxy-fiberglass compositions drastically attenuate high-frequency acoustic energy.

As previously mentioned, the coaxial plastic members 33 and 53 must have a low acoustic resistance. In other words, the material used for these members 33 and 53 should attenuate acoustic energy passing therethrough as little as possible. The characteristic acoustic impedance of the members 33 and 53 is of much greater significance however, since it is this property that will almost entirely determine the overall efficiency of the tool 10. By way of explanation, it must first be appreciated that if, for example, only a small percentage of a given burst of acoustic energy emitted from the crystal 23 can be transferred from the oil in the inner body space 22 into the inner coaxial member 33, the overall efficiency of the tool 10 will be affected. Similarly, if acoustic energy cannot be effectively transmitted from the inner coaxial member 33 into the oil in the outer space 58 and on into the outer coaxial member 53, the operation of the tool 10 will be affected. In short, there is a problem of efficiently transferring or coupling acoustic energy in either direction at each boundary or change in medium between the crystal 23 and the well bore wall.

The measure of how efficiently acoustic energy can be transferred or coupled from one medium to another is determined by the characteristic acoustic impedance of each medium. The acoustic impedance of a given material is, therefore, determined by:

$$Z = \rho . v \qquad \text{(Equation 1)}$$

where:

$\rho$ = density of material; and
$v$ = velocity of sound in that material.

In turn, the effectiveness of the transfer or coupling of acoustic energy from one medium to another adjacent medium is expressed as:

$$\alpha = \frac{4Z_1 Z_2}{(Z_1 + Z_2)^2} \quad \text{(Equation 2)}$$

where the subscripts "1" and "2" respectively relate to the two particular mediums in question.

Accordingly, considering Equation 2, it will be recognized that maximum efficiency will be where $Z_1$ equals $Z_2$ so that the coefficient of transmission, $\alpha$, will be 1.00. This would, of course, mean that all of the acoustic energy moving from the first medium into the second medium will be transferred and none of the energy will be reflected. On the other hand, the coefficient of transmission, $\alpha$, will decrease if the values of $Z_1$ and $Z_2$ differ.

For example, if $Z_1$ is double $Z_2$, the coefficient of transmission, $\alpha$, will be 0.89 which means that 11% of the acoustic energy moving from one medium toward the other medium would be reflected back and could not be used. Thus, ignoring other losses, if the characteristic acoustic impedance of the inner and outer wall members 33 and 53 was four times the impedance of the oil in the spaces 22 and 58 and the well bore fluids, no more than 16.8% of the transmitted energy will ever reach the well bore wall. A corresponding loss would also be realized for the acoustic energy returning from the well bore wall.

Since the densities of the various mediums involved do not widely vary, it will be recognized from Equation 1 that the velocity of sound through the material selected for the members 33 and 53 is, therefore, the most-significant indicator, if not the major determinator, of the efficiency of this energy transfer. Thus, the most-efficient energy transfer is realized where the velocity of sound in the selected plastic composition is approximately the same as the velocity of sound in typical well bore fluids as well as in the oil filling the spaces 22 and 58.

Accordingly, since the velocity of sound is only in the order of 5,000 f.p.s. in oils and characteristic well bore fluids, 17,000 f.p.s. in steel and 14,000 f.p.s. in typical high-strength plastics such as an epoxy-fiberglass, the inventor has recognized that the velocity of sound in a suitable material for the enclosure members 33 and 53 had to be relatively low and as near to 5,000 f.p.s. as possible to obtain a material with a characteristic acoustic impedance approaching that of oil and well bore fluids. It will also be appreciated that this selected material still has to have substantial strength even at elevated well bore temperatures and pressures. As a result, therefore, the only suitable composition presently known which adequately meets all of these requirements is an aromatic polyimide-resin plastic material presently marketed by E. I. du Pont de Nemours & Co. under the trademark of Vespel and by Dixon Corporation under the trademark Meldin. In particular, the selected grade of Vespel is presently designated by Du Pont as "SP-1" which is described in their Bulletin A-43721 as being formed from the unmodified or base polyimide resin instead of having any one of several listed additive materials. The corresponding grade of Meldin is designated "PI."

In testing the SP-1 Vespel material, it was found that the velocity of sound therethrough is in the order of 8,000 f.p.s. Thus, since its specific gravity is 1.43, the characteristic acoustic impedance of this selected plastic composition is about $3.0 \times 10^6$ -kg./sec. m.$^2$ (in metric units) as compared to characteristic impedances of about $1.5 \times 10^6$ for water and for oil, $6.0 \times 10^6$ for epoxy-fiberglass, and about $32.5 \times 10^6$ for steel.

As previously mentioned, with only a single transducer as at 23, particular care must also be taken to prevent the outwardly directed bursts of acoustic energy from reflecting back from the circumferential members 33 and 53 onto the transducer and interfering with the reception of acoustic signals returning from the well bore walls. This problem is effectively solved, however, by the present invention. For example, considering first of all the inner acoustic window, as illustrated in FIG. 2 the inner surface of the inner coaxial member 33 is closely spaced just outside of the path taken by the outwardly-facing transducer 23. Thus, as a burst of high-frequency acoustic energy is directed outwardly, the small portion thereof that is reflected directly back from the inner member 33 onto the crystal 23 will strike the transducer long before any portion of the outwardly directed acoustic energy has had time to reach and be reflected from the adjacent well bore wall back to the transducer. Stated another way, the electrical circuitry will be sequenced so that any acoustic energy reflected from the inner acoustic window 33 will return to the transducer 23 well before the transducer begins receiving acoustic energy reflected from the well bore wall.

The same situation is, however, not the case when the outer coaxial section of the enclosure 20 is mounted on the tool 10. Although the distance from the transducer 23 to the inner surface of the outer acoustic window 53 is less than the distance to the well bore wall, it has been found that some objectionable interference will occur if the plastic member was an upright cylinder since a reflection from the final portion of an outwardly transmitted burst could possibly arrive at the transducer at about the same time that the first portion of the reflected acoustic wave from the well bore wall is arriving. Accordingly, to prevent reflections of the outwardly directed bursts from the outer plastic member 53 from returning to the transducer 23, the plastic member of the present invention is arranged as a frusto-conical tubular member uniformly disposed about the vertical axis of the tool 10 and having its sides inclined outwardly at a slight angle in relation to the vertical axis. It has been found that the optimum inclination here is about 15° from the vertical, with about 20° being the greatest permissible inclination. Tests have shown that inclinations greater than about 20° result in an excessive percentage of the acoustic energy being reflected.

It was also found that by forming a slight concavity, as at 63, around the inner plastic member 33 in line with the radial axis of the crystal 23, there will be somewhat of a focussing effect of the acoustic energy passing through the plastic member which improves the operation of the tool 10.

Accordingly, when the logging tool 10 is to be used in a well bore, the enclosure 20 is arranged so that the annular clearance in the well bore around the plastic enclosure will be as narrow as possible to obtain a clear visual display. By way of explanation for this, it has been found that although there is an effective transfer of acoustic energy to and from the well bore fluids, suspended solids in these fluids will tend to spuriously reflect or scatter high-frequency acoustic energy and reduce the clarity of the visual record obtained. Thus, by minimizing the length of the path through the well bore fluids which the high-frequency acoustic energy must pass, this spurious interference will be limited.

As a result, when the diameter of the well bore is relatively small, the outer coaxial section of the enclosure 20 is not used. On the other hand, when the tool 10 is to be used in a well bore substantially larger than the inner plastic member 33, the outer coaxial section of the enclosure 20 is mounted on the tool. In this manner, a substantial portion of the path of the acoustic energy will be through the liquid-confining spaces 22 and 58. It will, of course, be appreciated that by making the outer coaxial section of the enclosure 20 wholly independent of the inner section, a number of such outer sections of various outer diameters can be provided for a single logging tool to accommodate different well bore diameters.

Accordingly, it will be appreciated that the present invention has provided new and improved enclosures for high-frequency acoustic logging tools for circumferentially scanning a well bore. Although changes and modifications may be made in the disclosed embodiment without departing from the principles of the invention, the unique enclosure will neither materially affect acoustic signals passing therethrough nor significantly reduce the overall mechanical strength of the tool.

What is claimed is:

1. Acoustic-logging apparatus adapted for suspension in a well bore containing fluids and comprising: a support; enclosure means on said support adapted for confining a liquid therein and including an exterior portion through which high-frequency acoustic energy is to be passed composed substantially of a rigid material aromatic polyimide resin having a characteristic acoustic impedance no greater than about twice the characteristic acoustic impedance of a liquid confined in said enclosure means; and high-frequency acoustic-transducer means adapted to operate at a frequency of at least about 500 kilocycles operatively mounted in said enclosure and directed toward said exterior portion thereof.

2. The acoustic-logging apparatus of claim 1 wherein said acoustic-transducer means are directed along a selected operating axis; and said exterior portion is substantially normal to said operating axis and immediately adjacent to said acoustic-transducer means.

3. The acoustic-logging apparatus of claim 1 wherein said acoustic-transducer means are directed along a selected operating axis; and said exterior portion is inclined in relation to said operating axis at an angle between 70° and 90°.

4. The acoustic-logging apparatus of claim 3 further including: an interior wall across said operating axis between said exterior portion and said acoustic-transducer means composed substantially of a rigid material aromatic polyimide resin having a characteristic acoustic impedance no greater than about twice the characteristic acoustic impedance of a liquid confined in said enclosure means; and means fluidly sealing said interior wall in relation to said exterior portion for confining a liquid therebetween.

5. Acoustic-logging apparatus adapted for suspension in a well bore containing fluids and comprising: a support; enclosure means on said support adapted to confine a liquid therein and including an exterior wall composed substantially of a rigid aromatic polyimide resin material having a characteristic acoustic impedance no greater than about twice the characteristic acoustic impedance of a liquid confined therein; high-frequency acoustic-transducer means having an operating frequency of at least about 500 kilocycles arranged in said enclosure means for operation along a directed axis; and means on said support and selectively operable for progressively traversing said operational axis of said acoustic-transducer means along a predetermined plane intersecting said external wall.

6. The acoustic-logging apparatus of claim 5 further including: focussing means on said exterior wall adapted for focussing acoustic energy passing therethrough along said predetermined plane.

7. The acoustic-logging apparatus of claim 5 wherein said exterior wall is inclined in relation to said predetermined operational plane at an angle between 70° and 90°.

8. Acoustic-logging apparatus adapted for suspension in a well bore containing fluids and comprising: a housing arranged along a central axis and including a tubular body adapted to confine a liquid therein and having an upright exterior wall composed substantially of a rigid aromatic polyimide resin material having a characteristic acoustic impedance no greater than about twice the characteristic acoustic impedance of a liquid to be confined therein; high-frequency acoustic-transducer means having an operating frequency of at least about 500 kilocycles operatively mounted in said housing for rotation about said central axis thereof and having a directional lateral axis of operation intersecting said upright wall; and means in said housing and selectively operable for rotating said acoustic-transducer means about said central axis for progressively sweeping said lateral axis of operation of said acoustic-transducer means along a predetermined transverse plane passing through said upright wall.

9. The acoustic-logging apparatus of claim 8 further including: an enlarged-diameter tubular assembly coaxially mounted around said tubular body for confining a liquid therein and having an annular wall intersected by said transverse plane and included in relation thereto at an angle between 70° and 90°, said annular wall being comprised of a rigid material having a characteristic acoustic impedance no greater than about twice the characteristic acoustic impedance of a liquid to be confined therein.

10. The acoustic-logging apparatus of claim 9 wherein said rigid material for said annular wall is also composed substantially of an aromatic polyimide resin.

11. The acoustic-logging apparatus of claim 8 wherein said acoustic-transducer means include a single piezoelectric crystal; and further including circuit means coupled to said crystal and selectively operable for alternately transmitting bursts of acoustic energy outwardly along said lateral axis of operation and then receiving reflected acoustic energy returning inwardly along said lateral axis of operation.

12. The acoustic-logging apparatus of claim 8 further including means on said housing adapted for equalizing pressure differentials between the exterior and interior of said tubular body.

13. Acoustic-logging apparatus adapted for suspension in a well bore containing fluids and comprising: a fluidtight housing including a plurality of tandemly-connected tubular bodies arranged along a central axis and defining a fluidtight interior space adapted to contain a liquid therein, one of said tubular bodies including upper, intermediate, and lower sections rigidly connected in tandem to one another, said intermediate body section providing the sole interconnection between said upper and lower sections and being comprised solely of a rigid nonmetallic material having a characteristic acoustic impedance no greater than about twice the characteristic acoustic impedance of a liquid to be contained therein; selectively-operable rotating means in said housing and including an axially-aligned shaft in said interior space of said intermediate body section; and a high-frequency acoustic transducer having an operating frequency of at least about 500 kilocycles mounted on said shaft and directed toward the inner wall of said intermediate body section for operation along a lateral axis progressively sweeping around said inner body wall upon operation of said rotating means.

14. The acoustic-logging apparatus of claim 13 wherein said rigid material is composed substantially of an aromatic polyimide resin.

15. The acoustic-logging apparatus of claim 14 further including: an annular assembly coaxially mounted around said fluidtight housing and fluidly sealed in relation thereto to define an annular space therebetween for containing a liquid, said annular assembly including a tubular frusto-conical rigid section comprised substantially of an aromatic polyimide resin coaxially spaced around said intermediate body section and inclined at an angle between 70° and 90° in relation to said lateral operating axis.

16. The acoustic-logging apparatus of claim 15 wherein said annular assembly is movable in relation to said fluidtight housing; and further including means for releasably securing said annular assembly onto said fluidtight housing.

17. The acoustic-logging apparatus of claim 16 further including: first and second means for respectively equalizing pressure differentials between said annular space and said interior space and the exterior of said assembly and said fluidtight housing.

18. Acoustic-logging apparatus adapted for suspension in a well bore containing fluids and comprising: a longitudinal support; high-frequency acoustic-transducer means in said support and operative in a plane normal to the central axis of said support; said support including a rigid nonmetallic wall section disposed around said transducer means and comprised solely of an aromatic polyimide resin material having an effective acoustic transmission factor with respect to fluids for transmission of high-frequency acoustic signals therethrough without significant attenuation.

19. The acoustic-logging apparatus of claim 18 wherein said nonmetallic wall section is inclined in relation to said operating plane at an angle between 70° and 90°.

20. The acoustic-logging apparatus of claim 18 further including a concave focussing surface formed in the exterior surface of said nonmetallic wall section for focussing acoustic signals passing along said operating plane.

21. The acoustic-logging apparatus of claim 18 further including a second rigid nonmetallic wall section laterally spaced from said first-mentioned nonmetallic wall section and comprised of said aromatic polyimide resin material; and means fluidly sealing said second nonmetallic wall section in relation to said support for defining a fluidtight space between said nonmetallic wall sections adapted to receive a liquid for effectively transferring acoustic energy between said nonmetallic wall sections.

22. The acoustic-logging apparatus of claim 21 further including: means adapted for equalizing any pressure differential between said fluidtight space and the exterior of said second nonmetallic wall section.

23. The acoustic-logging apparatus of claim 21 further including a concave focussing surface formed in the exterior surface of said first nonmetallic wall section for focussing acoustic signals passing along said operating plane.

24. Acoustic-logging apparatus adapted for suspension in a well bore containing fluids and including: a support having upper and lower members with longitudinally-separated opposed end portions defining a space therebetween adapted for receiving high-frequency acoustic-transducer means adapted to operate at a frequency of at least about 500 kilocycles; and means for rigidly interconnecting said support members consisting solely of an upright tubular member comprised substantially of a rigid nonmetallic material having an effective acoustic transmission factor with respect to fluids for transmission of high-frequency acoustic signals therethrough without significant attenuation, and first and second means respectively coupling the upper and lower ends of said upright tubular member to said opposed end portions of said support members.

25. The acoustic-logging apparatus of claim 24 further including a concavity formed about the perimeter of the exterior surface of said upright tubular member for focussing acoustic signals passing therethrough.

26. The acoustic-logging apparatus of claim 24 further including a second upright tubular member of said rigid nonmetallic material coaxially disposed around said first-mentioned upright tubular member; and means fluidly sealing said second tubular member in relation to said support for defining a fluidtight space between said upright tubular members.

27. The acoustic-logging apparatus of claim 26 further including means adapted for equalizing pressure differentials between said fluidtight space and the exterior thereof.

28. The acoustic-logging apparatus of claim 26 wherein said first tubular member is cylindrical and said second tubular member is frusto-conical with the wall thereof being inclined outwardly no more than 20° in relation to the vertical axis of said support.

29. The acoustic-logging apparatus of claim 28 further including a concavity formed about the circumference of a portion of the exterior surface of said first tubular member for focussing acoustic signals passing therethrough.

References Cited

UNITED STATES PATENTS

| | | | |
|---|---|---|---|
| 2,631,270 | 3/1953 | Goble | 340—1 |
| 3,056,464 | 10/1962 | Marks. | |
| 3,213,415 | 10/1965 | Moser et al. | |
| 3,278,771 | 10/1966 | Fry. | |
| 3,378,097 | 4/1968 | Straus et al. | 181—.5 |
| 3,390,737 | 7/1968 | Johnson | 181—.5 |
| 3,434,563 | 3/1969 | Zemanek | 181—.5 |

RODNEY D. BENNETT, Jr., Primary Examiner

B. L. RIBANDO, Assistant Examiner

U.S. Cl. X.R.

340—18; 181—.5